United States Patent [19]

Phillips et al.

[11] 4,302,272
[45] Nov. 24, 1981

[54] PROCESS FOR HEAT SEALING POLYURETHANE FOAM

[75] Inventors: Barry A. Phillips, Slovan; Keith G. Spitler, Bethel Park, both of Pa.; Richard E. Keegan, New Martinsville, W. Va.

[73] Assignee: Mobay Chemical Corporation, Pittsburgh, Pa.

[21] Appl. No.: 112,046

[22] Filed: Jan. 14, 1980

Related U.S. Application Data

[63] Continuation of Ser. No. 8,030, Jan. 31, 1979, abandoned.

[51] Int. Cl.³ .............................................. B32B 31/20
[52] U.S. Cl. .................................. 156/309.9; 156/78; 156/82; 156/273; 156/320; 156/322; 264/46.4; 428/310; 428/320; 521/156; 521/171; 521/904; 521/914; 528/65; 528/73
[58] Field of Search ............. 156/78, 308.2, 82, 309.9, 156/273, 320, 322; 428/310, 320; 264/46.4; 528/65, 73; 521/156, 904, 171, 914

[56] References Cited

U.S. PATENT DOCUMENTS

| | | | |
|---|---|---|---|
| 3,238,273 | 3/1966 | Hampson et al. | 521/914 |
| 3,244,754 | 4/1966 | Bruson et al. | 521/171 |
| 3,255,126 | 6/1966 | Fuzesi et al. | 521/171 |
| 3,400,196 | 9/1968 | Le Roy | 428/310 |
| 3,497,416 | 2/1970 | Critchfield et al. | 156/308.2 |
| 3,530,030 | 9/1970 | Adams et al. | 156/82 |
| 3,801,518 | 4/1974 | Irwin et al. | 521/904 |

FOREIGN PATENT DOCUMENTS 48-7999 1/1973 Japan .................. 521/171

*Primary Examiner*—John J. Gallagher
*Attorney, Agent, or Firm*—Gene Harsh; Joseph C. Gil

[57] ABSTRACT

The instant invention is directed to a process for heat sealing flexible polyurethane foam, comprising:

A. reacting and foaming a polyurethane foam produced by the steps comprising reacting:
  (I) an organic polyisocyanate;
  (II) a polyol having a molecular weight of 2,000 to 8,000 comprising the adduct obtained by sequentially reacting:
    (a) a polyhydroxyl initiator, with a functionality of 2 to 5 and a weight average molecular weight as determined by gel permeation chromatography of from 62 to 200; with
    (b) 10 to 90%, most preferably 10 to 50%, by weight, based on the total oxide present in (b)+(c)+(d), a first alkylene oxide; and subsequently reacting the product with
    (c) 10 to 80%, preferably 20 to 50% by weight, based on the total oxide present in (b)+(c)+(d), 4,4,4-trichloro-1,2-epoxybutane and/or epihalohydrin; and subsequently reacting the product with
    (d) 10 to 60%, most preferably 10 to 40%, by weight, based on the total oxide present in (b)+(c)+(d), a second alkylene oxide.
  (III) foaming agent; and optionally
  (IV) catalyst;
B. heating a portion of the surface of said flexible polyurethane foam of (A) above its melting or fusion point; and
C. cooling said flexible polyurethane foam below its melting or fusion point.

18 Claims, No Drawings

1

PROCESS FOR HEAT SEALING POLYURETHANE FOAM

This is a continuation of application Ser. No. 8,030 filed Jan. 31, 1979, now abandoned.

BACKGROUND OF THE INVENTION

This invention relates to a process for heat sealing flexible polyurethane foams prepared from 4,4,4-trichloro-1,2-epoxybutane and/or epihalohydrin-based polyols.

In many applications in which flexible polyurethane foams are used, it is desired to emboss the foam so that it adheres to itself along a design or to adhere the foam to another substrate.

Several heat sealing methods are known in the art which do not require an adhesive. One such method, which is particularly desirable in view of its speed and ease of application, is the so-called dielectric heat sealing method. By applying radio frequency to a material containing polar substituents, the dipole rotates causing friction heating. By applying the electric field and compressing along a design, the foam will melt along the design. The melting foam may also form a bond with a substrate, such as a seat or cushion cover.

There are three parameters which are relevant in a suitable product:
1. foam processing
2. foam properties (compression set)
3. dielectric heat sealability.

A flexible foam recipe requires the use of a blowing agent. If the blowing agent is trapped in the spaces of the foam, the foam will shrink as it cools. It is, therefore, necessary to open a number of the cells to allow the blowing agent, $CO_2$ for example, to escape. The ability to open the cells is dependent on the degree of cross linking. A highly functional polyol causes extensive cross linking which makes it difficult to open the cells to avoid shrinkage.

The chief foam property of concern in the instant invention is compression set. Compression set is the percentage of the foam which does not recover after being compressed. A 90% compression set means only 10% of the foam recovered. A low compression set is desired. An embossed foam loses its aesthetic value if the portion of the foam not sealed does not stand out. If a cushion sealed to a cover has a high compression set, the cover will have no support and thus result in an excess of cover material.

The sealability characteristic in dielectric heat sealing is attained by the rotation of the polar groups which generate heat by friction. Steric hindrance deters the ability of the polar groups to rotate. Extensive cross linking may also deter polar rotation. If an insufficient number of polar groups are present, the heat seal or melt strength will be irregular or ineffective. On the other hand, an excess of polar groups in foams generally results in a high compression set.

One of the early attempts at producing a dielectrically heat sealable foam incorporated a polyvinyl chloride dispersion in the foam. The solids in dispersions, however, tend to migrate or settle. The polar groups tended to disperse irregularly and unpredictably.

U.S. Pat. No. 4,060,439 attempted to improve the dispersibility of the polar groups in the foam by the use of a polymer polyol. This resulted in a better dispersion of the solids, however, some settling of the solids did occur. This leads to foam wherein a sample from a top layer will require a higher frequency and temperature to attain a seal than a lower layer.

Another attempt at producing dielectrically heat sealable foams, U.S. Pat. No. 3,674,718, uses a cyanoethylated polyol. The polyol contains 5 to 30%, by weight, of cyanoethyl groups. When 30% of the cyanoethyl groups are used there are sufficient polar groups to attain a good seal; but, unlike the dispersions of the prior art the high percentage of cyanoethyl groups have a tendency to degrade upon heating before the melt temperature is reached. The cells of the resulting foams cannot be opened sufficiently and shrinkage occurs. If only 5% cyanoethyl groups are used, a good foam is obtained but there are insufficient polar groups to get a good seal.

The block polyols used in the instant invention result in foams with reproducible dielectric heat sealability results throughout the foam, unlike the dispersions used in the prior art. Also the degree of cross linking is controlled by the low functional block polyols.

DESCRIPTION OF THE INVENTION

The instant invention is directed to a process for heat sealing flexible polyurethane foam, comprising:
A. preparing a polyurethane foam by the steps comprising reacting:
  (I) an organic polyisocyanate;
  (II) a polyol having a molecular weight of 2,000 to 8,000 comprising the adduct obtained by sequentially reacting:
    (a) a polyhydroxyl initiator, with a functionality of 2 to 5 and a weight average molecular weight as determined by gel permeation chromatography of from 62 to 200; with
    (b) 10 to 90%, most preferably 10 to 50%, by weight, based on the total oxide present in (b)+(c)+(d), a first alkylene oxide; and subsequently reacting the product with
    (c) 10 to 80%, preferably 20 to 50%, by weight, based on the total oxide present in (b)+(c)+(d), 4,4,4-trichloro-1,2-epoxybutane and/or epihalohydrin; and subsequently reacting the product with
    (d) 10 to 60%, most preferably 10 to 40%, by weight, based on the total oxide present in (b)+(c)+(d), a second alkylene oxide.
  (III) foaming agent; and optionally
  (IV) catalyst;
B. heating a portion of the surface of said flexible polyurethane foam of (A) above its melting or fusion point; and
C. cooling said flexible polyurethane foam below its melting or fusion point.

The instant invention is also directed to a process for heat sealing flexible polyurethane foam to a substrate, comprising:
A. preparing a flexible polyurethane foam by the steps comprising reacting:
  (I) an organic polyisocyanate;
  (II) a polyol having a molecular weight of 2,000 to 8,000 comprising the adduct obtained by sequentially reacting:
    (a) a polyhydroxyl initiator having a functionality of 2 to 5 and a weight average molecular weight as determined by gel permeation chromatography of from 50 to 200; with (b) 10 to 90%, by weight, based on the total oxide present in (b)+(c)+(d), a first alkylene oxide; and subsequently reacting the product with (c) 10 to 80%, by weight, based on the total oxide present in (b)+(c)+(d), 4,4,4-trichloro-1,2-epoxybutane and/or epihalohydrin; and subsequently reacting the product with (d) 10 to 60%, by weight, based on the total oxide present in (b)+(c)+(d), a second alkylene oxide;

(III) foaming agent; and optionally (IV) catalyst;

B. heating a portion of the surface of said flexible polyurethane foam of (A) above its melting or fusion point;

C. contacting the melted or fused surface of said polyurethane flexible foam of (A) with a substrate whereby a flexible polyurethane foam/substrate laminate is formed; and D. cooling said flexible polyurethane foam/substrate laminate below the melting or fusion point of said foam.

The polyols used in preparing the foams used in the process may be represented by the following blocks:

| initiator | alkylene oxide | TCBO and/or epihalohydrin | alkylene oxide |

| initiator | TCBO and/or epihalohydrin | alkylene oxide |

| initiator | alkylene oxide | TCBO and/or epihalohydrin |

Any polyhydric alcohol containing 2 to 5 hydroxyl groups may be employed as the initiator. Illustrative polyhydric alcohols include, but are not limited to glycerol, ethylene glycol, propylene glycol, isobutylene glycol, trimethylene glycol, pentaerythritol, hexanetriol, trimethylol propane, trimethylol ethane, 1,2-butanediol, diethylene glycol, triethylene glycol, 2-butene-1,4-diol, 2-butyne-1,4-diol, 3chloro-1,2-propanediol, 2-chloro-1,3-propanediol, 2,3-butanediol, 1,4-dihydroxy-2-butene, 1,4-dihydroxycyclohexane, 2,2-dimethyl-1,3-propanediol, 2-ethyl-2-butyl-1,3-propanediol, erythritol, polyvinyl alcohol, polyalkyl alcohol, 1,4-dimethylolbenzene, dimethylol xylenes, dimethyloltoluenes, dimethylolnaphthalenes, glycerine monochlorohydrin, 2,2,3,3-tetrachloro-1,4-butanediol, 3,3,3-trichloro-1,2-propylene glycol, 3,3-dichloro-1,2-propanediol, monochlorohydrin of pentaerythritol, monochloro-1,2-propanediol, diglycerol, and condensates of alkylene oxides. The presently preferred initiator is glycerol.

One of the primary considerations in selecting a polyhydroxy initiator is the functionality desired in the product. An examination of the structure of the products obtained confirms the fact that the functionality of the polyol is approximately (some initiator will remain as monomer in any mixture) the same as the functionality of the initiating compound used to prepare it. For example, when a triol is used as the polyhydroxy initiating compound, a trifunctional polyol is obtained as the product. When a tetrol is used as the initiating compound, a tetrahydric ether is obtained. When these polyols are to be used in the preparation of polyurethanes, the degree of functionality directly influences the degree of cross-linking in the polyurethane composition and, consequently, the rigidity and hardness of the product. In general, the greater the degree of cross-linking, the harder and more rigid the product. Consequently, more highly functional polyols are normally preferred when preparing hard, rigid polyurethane products. When softer, more flexible polyurethane foams are desired, less highly functional polyols should be utilized and consequently, less highly functional polyhydroxy initiating compounds should be employed for the preparation of the polyols. The functionality of the initiator in the instant invention is between 2 and 5 since flexible foams are desired. In preparing flexible foams, the initiator should preferably have a weight average molecular weight as determined by gel permeation chromatography of from 62 to 200.

The alkoxylation steps [the sequential addition of components (b), (c) and (d)] can be performed in a manner known and recognized in the art for alkoxylation reactions. The temperature of the reaction will naturally vary depending upon the reactants employed and amounts thereof, the catalyst, if any, and amount thereof and the reaction time. Generally, however, the reactions are conducted in the temperature range of between about 0° and 200° C., preferably between about 20 and 80° C., although, if desired, the reactions can be conducted at room temperature. The reaction time will also vary depending upon the temperature of the reactions, the reactants and ratio thereof and the catalyst and amount thereof, if any. The reaction time is governed by the feed ratio of the alkylene oxide such as to permit control of the exotherm. Generally, however, a reaction time in the range of between about 2 to 15, preferably 2 to 6, hours is employed for each addition. The reaction mixture is generally allowed to proceed until all of the oxide has reacted. Since this conversion is exothermic, when the temperature drops the conversion is essentially complete. The reaction mixture is normally heated for a short time after the temperature drop to assure complete conversion.

Although the addition reactions may be conducted without catalyst, a Lewis acid catalyst is generally used. Generally, the Lewis acid is employed in an amount from about 0.05 to 3%, by weight, based on the total quantities of reactants. Any Lewis acid may be employed, for example, boron trifluoride etherate, boron trifluoride, boron trichloride, aluminum chloride, titanium tetrachloride, tin tetrachloride, ferric chloride or acidic clays.

The alkylene oxides, other than TCBO and epihalohydrin, used generally correspond to the general formula:

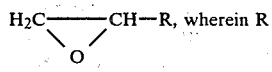
$H_2C\underset{O}{\overset{}{\diagdown\diagup}}CH-R$, wherein R represents hydrogen, an alkyl group of from one to three carbon atoms, or an alkyl group of from one to three carbon atoms substituted with a phenyl group. Specific examples include ethylene oxide, 1,2-propylene oxide, styrene oxide and 1,2-butylene oxide. The presently preferred materials are ethylene oxide and propylene oxide.

The amount of alkylene oxide used in the first alkoxylation is 10 to 90%, preferably 10 to 50%, by weight, based on the total oxide present in steps (b), (c) and (d). The alkylene oxides (b) and (d) may be the same or different. The amount of 4,4,4-trichloro-1,2-epoxybutane (TCBO) and/or epihalohydrin used in step (c) is 10 to 80%, preferably 20 to 50%, by weight, based on the total oxide present in steps (b), (c) and (d). Although TCBO and epihalohydrin are alkylene oxides, in the instant invention, they are not used as components (b) or (d). The amount of alkylene oxide used in step (d) is 10 to 60%, preferably 10 to 40%, by weight, based on the total oxide present in steps (b), (c) and (d).

Although the molecular weight of the polyol may vary over a wide range, the preferred range is 2,000 to 8,000, preferably 5,500 to 7,000, as determined by gel permeation chromatography.

The polyurethane foams of the invention are prepared by reacting the TCBO and/or epihalohydrin polyols alone or admixed with other polyols, with an organic polyisocyanate in the presence of a reaction catalyst and optionally a foaming agent.

The isocyanates preferably used in the foams of the invention include aliphatic, cycloaliphatic, araliphatic, aromatic and heterocyclic polyisocyanates, such as those described, for example, by W. Siefken in Justus Liebigs Annalen der Chemie, 562, pages 75 to 136. Examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethylcyclohexane (German Auslegeschrift No. 1,202,785, U.S. Pat. No. 3,401,190); hexahydrotolylene-2,4- and -2,6-diisocyanate and mixtures of these isomers; hexahydrophenylene-1,3- and/or -1,4-diisocyanate; perhydrodiphenylmethane-2,4'- and/or 4,4'-diisocyanate; phenylene-1,3- and -1,4-diisocyanate; tolylene-2,4- and -2,6-diisocyanate and mixtures of these isomers; diphenylmethane-2,4'- and/or -4,4'-diisocyanate; naphthylene-1,5-diisocyanate; triphenylmethane-4,4',4''-triisocyanate; m- and p-isocyanatophenyl-sulphonylisocyanate as described in U.S. Pat. No. 3,454,606; perchlorinated aryl polyisocyanates, such as the compounds described in U.S. Pat. No. 3,277,138; polyisocyanates containing carbodiimide groups as described in U.S. Pat. No. 3,152,162; the diisocyanates described in U.S. Pat. No. 3,492,330; polyisocyanates containing allophanate groups as described, for example, in British Pat. No. 994,890, Belgian Pat. No. 761,626 and published Dutch patent application No. 7,102,524; polyisocyanates containing urethane groups as described in Belgian Pat. No. 752,261 or in U.S. Pat. No. 3,394,164; polyisocyanates containing acylated urea groups as described in German Pat. No. 1,230,778; polyisocyanates containing biuret groups as described in U.S. Pat. Nos. 3,124,605 and 3,201,372 and in British Pat. No. 889,050; polyisocyanates prepared by telomerization reactions as described in U.S. Pat. No. 3,644,106; polyisocyanates containing ester groups, such as those described in British Pat. Nos. 965,474 and 1,072,956, in U.S. Pat. No. 3,567,763 and in German Pat. No. 1,231,688; reaction products of the abovementioned isocyanates with acetals as described in German Pat. No. 1,072,385; and polyisocyanates containing polymeric fatty acid residues as described in U.S. Pat. No. 3,455,883.

As a rule, it is particularly preferred to use readily available polyisocyanates such as tolylene-2,4- and -2,6-diisocyanate and mixtures of these isomers ("TDI").

The foaming agent optionally employed may be any of those known to be useful for this purpose, such as water, the halogenated hydrocarbons and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform and carbon tetrachloride. The amount of blowing agent employed may be varied within a wide range. Generally, however, the halogenated hydrocarbons are employed in an amount from 0 to 30 parts by weight per 100 parts by weight of the total polyol used in preparing the foam, and generally the water is employed in an amount of from 0 to 10 parts by weight per 100 parts by weight of the total polyol used in preparing the foam.

The polyurethane foams are prepared in the presence of a catalytic amount of a reaction catalyst. The catalyst or mixture of catalysts employed may be any of the catalysts known to be useful for this purpose, including tertiary amines and metallic salts. Typical tertiary amines include, but are not limited to, the following: diethanolamine, bis-dimethylaminopropylether, N-methyl morpholine, N-hydroxyethyl morpholine, triethylene diamine, triethylamine, trimethylamine. Typical metallic salts include, for example, the salt of antimony, tin and iron, e.g. dibutyltin dilaurate, stannous octoate, etc. Generally speaking, the catalyst is employed in an amount from 0.01 to 2.0 percent by weight based on the total polyol used in preparing the foam.

Various additives may be employed in the preparation of the polyurethane foams in order to achieve particular properties. Exemplificative of such additives include, but are not limited to, the following: monocarboxylic acids, polycarboxylic acids, polyesters, monohydroxy compounds, polyhydroxy compounds, etc.

It is preferred in the preparation of the polyurethane compounds of the present invention to employ minor amounts of a surfactant in order to improve the cell structure of the polyurethane foam. Typical of such surfactants are the silicone oils, and soaps. Generally up to 2 parts by weight of the surfactant is employed per 100 parts of total polyol.

Various additives can be employed which serve to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and antioxidants may be added.

The preferred substrates are polyurethanes, paper, kraft paper, leather, hides, cotton, linen, silk, hemp, jute, wool, flax, nylons, polyesters, Orlon, Dacron, rayon, rayon acetates, styrene polymers, vinyl chloride polymers and the like. The invention is not limited to any substrate and hence includes not only the above-enumerated substrates but also both ferrous and non-ferrous metals, vitreous materials, including glass, ceramics, clays, china, porcelain, and the like; cellulosic substrates including wood, ply-wood, cane, bamboo, rattan, and the like; proteinaceous materials including gelatin, and the like; natural fibers; as well as, building materials, including brick, granite, sandstone, plaster, tile, wall board, cement blocks, and the like; thermosetting polymers such as phenol-aldehyde condensation polymers, phenol ureas resins, epoxy resins, coumarone indene polymers and the like; and thermoplastic polymers such as acrylonitrile polymers, polycarbonates, polyacetals, polyamides, synthetic rubber, polyethylene, polypropylene, and the like.

The laminated structures of the invention can be used for various purposes such as insulation or padding of clothing where the substrate would be cloth, the sound deadening, and insulation of building materials, e.g. preformed panels and the like. Blocks of polyurethane foam can be heated sealed to each other (buttwelded) to form larger sections from smaller sections. Single-ply or multi-ply laminates can be fabricated with this invention.

Other uses for the laminates of this invention include the preparation of preformed cushioning for furniture, automobile seats, crash pads and the like.

The laminates of the invention are produced by heating part or all of the surface of the urethane foam described above to a temperature above the melt temperature of the foam to form a tacky liquid or semi-liquid layer, and thereafter or concurrently with the heating operation, applying the substrate to the tacky surface of the foam and holding in cntact therewith while cooling until the surface cools and resolidifies, thereby forming an adhesive bond between the foam and the substrate. The melt temperature of the foam will vary depending upon the nature and proportion of the components therein, but in general is in the range of from about 204° C. to about 315° C. It is in general desirable not to heat the surface of the foam to a temperature higher than about 38° C. above the melt temperature of the particular foam.

Methods include flame treatment of the surface or a heat sealing means with the polyurethane foam passing continuously over the heating source and then passing directly into contact with the desired substrate. Dielectric heating, heating lamps, e.g. infrared lamps, hot plates, hot air guns and the like can also be used. Dielectric heat sealing is preferred.

As a result of the inclusion of the requisite proportion of the polar polyol in the polyurethane foam-forming reaction mixture, the resulting foam is rendered dielectrically heat sealable to itself and other substrates. This desirable result is accomplished, as noted above, without the basic properties of the foam being otherwise degraded or altered.

The phenomenon of dielectric heat sealability of the polyurethane foam compositions of the invention is attributed to a high dissipation factor, i.e. high rate of conversion of electrical energy into heat, which is characteristic of these compositions. This in turn is due to the presence in the foam of the polar groups supplied by the polar polyols. The polar groups, upon the application of a high frequency voltage to the foam, rotate at a very fast rate, and this rotation results in a fast rate of dissipation or conversion of electrical energy into heat, and the heat so generated is in effect utilized to weld the foam to another thermoplastic material which is pressed against the foam surface, by softening or melting both materials at the interface or regions of contact. Thereafter, the voltage is cut off and the fused interface allowed to cool and solidify. The bond resulting at the interface is strong and permanent.

It is preferred to apply an adhesive to the surface of the foam and/or substrate before heat sealing. Any adhesive known in the art used to bind polyurethane foam to a substrate may be used. Preferred adhesives are nitrile, acrylic, polychloroprene adhesives and synthetic elastomer adhesives, or the like. Commercial examples of these adhesives include S/G 1099 (a nitrile adhesive), manufactured by Minnesota Mining and Manufacturing Co.; Adcote C76333 (an acrylic adhesive), manufactured by Morton Co.; S/G 1711 (a polychloroprene adhesive), manufactured by Minnesota Mining and Manufacturing; and Fome Bond 77 (a synthetic elastomer adhesive) manufactured by Swift Adhesives & Coatings Div.

The following examples are provided to illustrate the present invention.

EXAMPLES

Example 1

(Glycerol←50% PO←35% TCBO←15% EO)

53.6 g of glycerol and 55 g of $BF_3$-etherate (Lewis acid) were mixed with 500 ml of toluene (solvent). The reaction system was purged with nitrogen to prevent oxidation. The mixture was light brown with a $BF_3$-etherate/glycerol complex material which was insoluble in toluene forming a separate phase. 1724 g of propylene oxide were added to the mixture over a period of 10.5 hours while the system was under two pounds of nitrogen pressure. The temperature was kept below 30° C. with an ice bath. After 30% of the propylene oxide was added, the reaction mixture became clear and homogeneous. After heating the reaction mixture at 45° C. for one hour, 50 g of additional $BF_3$-etherate were added to the flask (a total of 3% of batch weight) followed by addition of 1207 g TCBO (4,4,4-trichloro-1,2-epoxybutane). The TCBO was added to the reaction mixture over 5 hours. The temperature was controlled at 35° C. with an ice bath. During the TCBO addition, the reaction mixture slowly darkened to a very dark brown. After an hour post reaction at 50° C., the polyol was cooled to 20° C. and 518 g of ethylene oxide were added over a period of 3 hours and the temperature was held at 28° C. with an ice bath. After 16 hours at 25° C., 46% potassium hydroxide (90 g) was added to the flask. The polyol was heated at 75° C. for one hour and stripped at 90° C. under full vacuum (1 mm Hg). 35 g of magnesium silicate were added to complete the neutralization and the reaction mixture was stripped further at 110° C. for one hour. Filtration gave a brown oil (3443 g, 94.7%): OH No. 28 (theory), Acid No. <0.05, % water 0.43, % Cl 21.58.

EXAMPLE 2

(Glycerol←49.2% PO←20.3% TCBO←30.5% PO)

1278 g of a glycerol/propylene oxide TCBO adduct with a hydroxyl number of 56 and 29 g of $BF_3$-etherate were mixed and the reaction system was purged with nitrogen. The mixture was placed under two pounds of nitrogen pressure and 548 g of propylene oxide were added slowly with vigorous stirring. The temperature increased slowly and was controlled at 30° C. with an ice bath. The reaction mixture was stirred at 26° C. for 17 hours after the propylene oxide addition was complete. The polyol was stripped at 80° C. under vacuum (1 mm Hg) to remove all volatile materials. 95 g of magnesium silicate were added and the product was stirred at 80° C. for 1.5 hours. Filtration gave a brown oil (1781 g, 97.5%): OH No. 28 (theory), Acid No. 0.02, % Cl 12.4.

EXAMPLE 3

(Glycerol←10% PO←50% TCBO←40% PO)

200 g of toluene, 24.5 g of glycerol and 12 g of BF$_3$-etherate were mixed and the reaction system was purged with nitrogen. The system was placed under two pounds of nitrogen pressure and 150 g of propylene oxide were added over 1.5 hours with vigorous stirring. The temperature was kept below 30° C. with an ice bath. The reaction mixture was allowed to stand at 25° C. for 17 hours. 55 g of BF$_3$— etherate were added to the flask followed by slow addition of 788 g of TCBO. The solution was stirred vigorously and the reaction temperature was controlled at 60° C. with an ice bath. At 55° C. the reaction mixture turned from slightly yellow to black. After the TCBO addition was complete, the temperature was held at 60° C. for 2.5 hours, followed by 17 hours at 25° C. 632 g of propylene oxide were added slowly with vigorous stirring. The temperature was controlled at 35° C. with an ice bath. After the propylene oxide addition, the reaction mixture was kept at 25° C. for 17 hours. The polyol was stripped at 80° C. under vacuum (1 mm Hg) to remove all volatile materials. 80 g of magnesium silicate were added and the product was stirred at 80° C. for two hours. Filtration gave a dark brown oil (1567 g, 97.8%): OH No. 28 (theory), Acid No. <0.01, % Cl 30.00.

EXAMPLE 4

(Glycerol←50% PO←35% EBH←15% EO)

31.1 g of glycerol and 55 g of BF$_3$-etherate were mixed with 300 g of toluene (solvent). The reaction system was purged with nitrogen to prevent oxidation. The mixture was placed under two pounds of nitrogen pressure and 1,000 g of propylene oxide were added over a period of 6.5 hours. The temperature was kept below 30° C. with an ice bath. 700 g of epibromohydrin were added over 5.5 hours. The temperature was held at 35° C. with an ice bath. The reaction mixture slowly darkened during the addition of epibromohydrin. 300 g of ethylene oxide were then added to the mixture over 3 hours. The temperature was kept below 30° C. with an ice bath. 47.6 g of 46% potassium hydroxide were added and the mixture stirred at 40° C. for 1.5 hours. The polyol was stripped at 80°-110° C. under full vacuum (1 mm Hg) to remove all volatile material. 20 g of magnesium silicate were added and the product was stirred at 80° C. for one hour. Filtration gave a dark brown oil (1881 g, 92.6%): OH No. 28 (theory), Acid No. 4.38, % water 0.19, % Br 20.01.

EXAMPLE 5 (Comparison)

(Glycerol←69.4% PO←30.6% TCBO)

2243 g of a glycerol/propylene oxide adduct with a hydroxyl number of 56 were mixed with 25 g of BF$_3$-etherate. The reaction system was purged with nitrogen to prevent oxidation. 9 g of TCBO (4,4,4-trichloro-1,2-epoxybutane) were added dropwise with vigorous stirring. The temperature of the mixture rose and was held at 85° C. with an ice bath during addition. After addition of TCBO the mixture was heated at 90° C. for eight hours. 66 g of 10.9% sodium hydroxide were added and the mixture was stirred for one hour at 90° C. Volatiles were removed by stripping at 85° C. under vacuum (1 mm Hg). 16 g of magnesium silicate were added and the mixture was stirred for two hours at 90° C. Filtration gave a dark brown oil (3100 g, 98.7%): OH No. 40 (theory), Acid No. 2.62, % Cl 16.71.

EXAMPLE 6 (Comparison)

(Glycerol←56% EPI←44% PO)

23.6 g of glycerol and 12 g of BF$_3$-etherate were mixed with 100 g of toluene. The reaction system was purged with nitrogen. 840 g of epichlorohydrin were added to the mixture over a period of 6.5 hours under two pounds of nitrogen pressure and with vigorous stirring. The temperature of the reaction mixture increased and was held at 80° C. with an ice bath. 6 g more of BF$_3$-etherate were added to the mixture and the temperature was reduced to 25° C. with an ice bath. 667 g of propylene oxide were added over 7 hours and the temperature was held at 35° C. with an ice bath. After 80% of the propylene oxide had been added, an additional 6 g of BF$_3$-etherate were added. The polyol was heated to 100° C. for one hour and was stripped under full vacuum (1 mm Hg). 75 g of magnesium silicate were added and the reaction mixture was stripped further. Filtration gave a dark brown oil (1408 g, 92% yield): OH No. 28 (theory), Acid No. 0.06, % Cl 22.32. A sample of the polyol taken after stripping but before addition of magnesium silicate gave the following: OH No. 28 (theory), Acid No. 2.54, % Cl 22.56.

EXAMPLE 7 (Comparison)

(Glycerol←56% TCBO←44% PO)

23.6 g of glycerol and 12 g of BF$_3$-etherate were mixed and the reaction system was purged with nitrogen. 840 g of TCBO were added dropwise with vigorous stirring. The reaction temperature slowly increased and was controlled at 80° C. with an ice bath. Additional BF$_3$-etherate (9 g and 5 g, respectively) was added to the reaction mixture after the TCBO addition was 45% and 83% complete. 134 g of toluene were added and the temperature was maintained at 80° C. for two hours after the TCBO addition. The polyol was allowed to stand at 25° C. for 17 hours. The temperature was lowered to 10° C. and 657 g of propylene oxide were added slowly with vigorous stirring. The reaction temperature was kept below 30° C. with an ice bath. More BF$_3$-etherate (10 g) was added after 50% of the propylene oxide had been introduced. After standing at 25° C. for 17 hours, the polyol was stripped at 100° C. under vacuum (1 mm Hg) to remove all volatile materials. The product was a black oil (1461 g, 96.1%) with an unusually high acid number: OH No. 28 (theory), Acid No. 9.0, % Cl 33.61.

EXAMPLE 7A (Comparison)

(Reduction of the acid number)

500 g of the product of Example 7 were stirred for eight hours at 60° C. with 25 g of magnesium silicate. Filtration gave a brown oil (475 g, 95.0%); Acid No. 0.51.

EXAMPLE 7B (Comparison)

(Reduction of the acid number)

250 g of the product of Example 7 were dissolved in 200 ml of toluene. The solution was washed successively with two 100 ml portions of 10.9% sodium hydroxide and four 100 ml portions of water. The organic layer was separated and stripped at 60° C. under vacuum with a nitrogen sparge. The product was a brown oil (215 g, 86%): Acid No. 0.06, % H$_2$O 0.035.

EXAMPLE 8-16

The formulations of the foams of Examples 8 through 16 and the dielectric heat sealability test results have been summarized in Table 1. The foams were produced by premixing the polyol in the activators in an air mixer (~2500 RPM) for about 15 seconds. The isocyanate was added and the mixture was further mixed for about 10 seconds. The mixture was then poured into a 12"×12"×6" cardboard box and allowed to foam.

The resulting foams were then tested for melt strength and compression set.

The subject polyurethane foams were placed in a Reevelec Model C6F-S 13-15 MC dielectric heating generator at 160° C. with a pulse time of 10 sec. and a dwell time of an additional 10 sec. In this manner a melt line was established on the foam sample ¼" wide by 2" long. The extent of melting is taken as an indication of the degree of responsiveness of the polyurethane foam matrix to the dielectric field. The extent of melting was measured as a tensile strength on an Instron set at a crosshead speed of 2 inches per minute. Values are reported in pounds per square inch. Similar responses are also seen at dielectric fields of 27 Mhz at varied pulse, dwell and temperature settings.

The compression set was determined for the foams several months after their preparation. They were tested in accordance with ASTM D-1564 Method B. The values recorded are the percent of the foam which did not recover.

such detail is solely for that purpose and that variations can be made therein by those skilled in the art without departing from the spirit and scope of the invention except as it may be limited by the claims.

What is claimed is:

1. A process for heat sealing flexible polyurethane foam to a substrate comprising:
A. reacting and foaming a flexible polyurethane foam produced by the steps comprising reacting:
(I) an organic polyisocyanate;
(II) a polyol having a molecular weight of 2,000 to 8,000 comprising the adduct obtained by sequentially reacting:
(a) a polyhydroxyl initiator, with a functionality of 2 to 5 and a weight average molecular weight as determined by gel permeation chromatography of from 50 to 200; with
(b) 10 to 90%, by weight based on the total oxide present in (b)+(c)+(d), a first alkylene oxide; and subsequently reacting the product with
(c) 10 to 80%, by weight, based on the total oxide present in (b)+(c)+(d), 4,4,4-trichloro-1,2-epoxybutane and/or epihalohydrin; and subsequently reacting the product with
(d) 10 to 60%, by weight, based on the total oxide present in (b)+(c)+(d), a second alkylene oxide;
(III) foaming agent; and optionally
(IV) catalyst;
B. allowing said resulting polyurethane foam to cure;

TABLE 1

| Components | Example | | | | | Comparison | | | |
|---|---|---|---|---|---|---|---|---|---|
| | 8 | 9 | 10 | 11 | 12 | 13 | 14 | 15 | 16 |
| Example 1 polyol | 30 | 50 | — | — | — | — | — | — | — |
| Example 2 polyol | — | — | 50 | — | — | — | — | — | — |
| Example 3 polyol | — | — | — | 50 | — | — | — | — | — |
| Example 4 polyol | — | — | — | — | 50 | — | — | — | — |
| Example 5 polyol | — | — | — | — | — | 30 | 50 | — | — |
| Example 6 polyol | — | — | — | — | — | — | — | 30 | — |
| [1]Example 7B polyol | — | — | — | — | — | — | — | — | 50 |
| [2]Polyether polyol A | 70 | 50 | 20 | 20 | 20 | — | — | — | 50 |
| [3]Polyether polyol B | — | — | 30 | 30 | 30 | 70 | 50 | 70 | — |
| [4]80/20 TDI | 41.3 | 33.8 | 33.7 | 33.7 | 33.7 | 30.1 | 31.6 | 27.6 | 33.8 |
| $H_2O$ | 1.8 | 1.48 | 1.86 | 2.2 | 2.2 | 2.0 | 2.0 | 2.0 | 1.65 |
| Diethanol amine | 1.0 | 1.0 | 1.0 | 1.0 | 1.0 | 1.0 | 1.0 | 1.0 | 1.0 |
| [5]Amine catalyst | 0.4 | 0.6 | 0.6 | 0.6 | 0.4 | 0.6 | 0.6 | 0.4 | 0.6 |
| Bis-dimethylamino-propylether | 0.1 | 0.1 | 0.1 | 0.1 | 0.1 | 0.1 | 0.1 | 0.05 | 0.1 |
| Dibutyl tin dilaurate | 0.15 | 0.15 | 0.15 | 0.15 | 0.17 | 0.15 | 0.15 | 0.15 | 0.15 |
| [6]Surfactant A | — | — | 0.5 | 1.0 | — | — | — | 0.8 | 1.0 |
| [7]Surfactant B | 1.0 | 1.0 | — | — | 1.0 | — | — | — | — |
| [8]Surfactant C | — | — | — | — | — | 1.2 | 1.2 | — | — |
| Results | | | | | | | | | |
| [9]Total $H_2O$ | 3.15 | 2.5 | 2.5 | 2.5 | 2.5 | — | — | — | 2.5 |
| [10]PSI | 71 | 114 | 114 | 99 | 114 | 43 | 71 | 43 | 97 |
| [11]Compression set (% not recovered) | 29 | 38 | 43 | 49 | 23 | 53 | 81 | 62 | 73 |

[1]Example 7B polyol - The polyol of Examples 7 and 7A would not react with the isocyanate to form a foam.
[2]Polyether polyol A - A 20% polyurea filled polyether polyol w/1.7 pbw $H_2O$. The base polyol has an OH No. of 34 and is a glycerine based polyether triol.
[3]Polyether polyol B - A glycerine based polyether triol with an OH No. of 28 and a high primary hydroxyl content.
[4]80/20 TDI - 80% 2,4- and 20% 2,6-toluene diisocyanate.

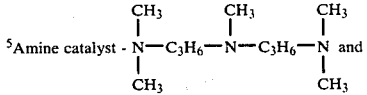

50% di-propylene glycol
[6]Surfactant A - Goldschmidt surfactant Tegostab ® B2909 which is a polyoxyalkylene dimethylsiloxane.
[7]Surfactant B - Goldschmidt surfactant Tegostab ® B4617 which is a polyoxyalkylene dimethylsiloxane.
[8]Surfactant C - Union Carbide surfactant L5303 dimethylsiloxane.
[9]Total $H_2O$ - This is relevant where the formulation contains polyether polyol A which contains water.
[10]PSI - pounds per square inch tensile at melt line.
[11]Compression set - ASTM D-1564 method B; 90% compression without autoclave.

Although the invention has been described in detail for the purpose of illustration, it is to be understood that C. heating a portion of the surface of said flexible polyurethane foam of (B) above its melting or fusion point; and D. contacting the melted or fused surface of said polyurethane flexible foam with a substrate whereby a flexible polyurethane foam/substrate laminate is formed; and E. cooling said flexible polyurethane foam/substrate laminate below the melting or fusion point of said foam.

2. The process of claim 1 wherein said alkylene oxide of (b) and (d) is ethylene oxide and/or propylene oxide.

3. The process of claim 1, wherein said polyhydroxyl initiator (a) has a functionality of 3.

4. The process of claim 3, wherein said polyhydroxyl initiator (a) is glycerol.

5. The process of claim 1, wherein said organic polyisocyanate (I) is toluene diisocyanate.

6. The process of claim 1, wherein component (c) is 4,4,4-trichloro-1,2-epoxybutane.

7. The process of claim 1, wherein component (c) is epihalohydrin.

8. The process of claim 1, wherein said polyol has a molecular weight of 5,500 to 7,000.

9. The process of claim 1, wherein component (b) is 10 to 50%;

(c) is 20 to 50%; and (d) is 10 to 40%.

10. A process for melting or fusing portions of flexible polyurethane foam, comprising:

A. preparing a polyurethane foam by the steps comprising reacting:

(I) an organic polyisocyanate;

(II) a polyol having a molecular weight of 2,000 to 8,000 comprising the adduct obtained by sequentially reacting:

(a) a polyhydroxyl initiator, with a functionality of 2 to 5 and a weight average molecular weight as determined by gel permeation chromatography of from 62 to 200; with (b) 10 to 90%, by weight, based on the total oxide present in (b)+(c)+(d), a first alkylene oxide; and subsequently reacting the product with (c) 10 to 80%, by weight, based on the total oxide present in (b)+(c)+(d), 4,4,4-trichloro-1,2-epoxybutane and/or epihalohydrin; and subsequently reacting the product with (d) 10 to 60%, by weight, based on the total oxide present in (b)+(c)+(d), a second alkylene oxide;

(III) foaming agent; and optionally (IV) catalyst;

B. allowing said resulting polyurethane foam to cure;

C. heating a portion of the surface of said flexible polyurethane foam of (B) above its melting or fusion point; and D. cooling said flexible polyurethane foam below its melting or fusion point.

11. The process of claim 10 wherein said alkylene oxide of (b) and (d) is ethylene oxide and/or propylene oxide.

12. The process of claim 10, wherein said polyhydroxyl initiator (a) has a functionality of 3.

13. The process of claim 12, wherein said polyhydroxyl initiator (a) is glycerol.

14. The process of claim 10, wherein said organic polyisocyanate (I) is toluene diisocyanate.

15. The process of claim 10, wherein component (c) is 4,4,4-trichloro-1,2-epoxybutane.

16. The process of claim 10, wherein component (c) is epihalohydrin.

17. The process of claim 10, wherein said polyol has a molecular weight of 5,500 to 7.000.

18. The process of claim 10, wherein component (b) is 10 to 50%;

(c) is 20 to 50%; and (d) is 10 to 40%.

* * * * *